United States Patent
Kim

(10) Patent No.: US 8,374,120 B2
(45) Date of Patent: Feb. 12, 2013

(54) BASE STATION APPARATUS BASED ON SWITCH FABRIC IN BROADBAND WIRELESS COMMUNICATION SYSTEM

(75) Inventor: Chang-Won Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1193 days.

(21) Appl. No.: 12/006,623

(22) Filed: Jan. 4, 2008

(65) Prior Publication Data

US 2008/0165726 A1 Jul. 10, 2008

(30) Foreign Application Priority Data

Jan. 9, 2007 (KR) ........................ 10-2007-0002344

(51) Int. Cl.
  *H04B 7/212* (2006.01)
(52) U.S. Cl. ...................... 370/323; 370/310.2; 370/327; 370/328; 370/340; 370/395.7; 370/535; 455/84; 455/422.1; 455/554.2; 455/560; 455/561; 398/45; 379/291; 379/313; 379/319; 379/335
(58) Field of Classification Search .................. 370/259, 370/310.2, 323, 327, 328, 329–339, 340, 370/349, 352–356, 389, 396, 395.7, 400, 370/422, 422.1, 428, 534–544; 455/84, 554.2, 455/560, 561; 379/84, 93.09, 93.14, 268, 379/271, 291, 310, 313, 319, 320, 335; 398/45, 398/46, 49, 50, 51, 54, 56
See application file for complete search history.

(56) References Cited

U.S. PATENT DOCUMENTS

| | | | |
|---|---|---|---|
| 6,330,429 B1* | 12/2001 | He | 455/67.11 |
| 6,574,221 B1* | 6/2003 | Petersen | 370/395.1 |
| 6,597,824 B2* | 7/2003 | Newberg et al. | 385/16 |
| 2004/0162919 A1* | 8/2004 | Williamson et al. | 709/250 |
| 2005/0124307 A1* | 6/2005 | Ammar et al. | 455/183.2 |
| 2006/0121934 A1* | 6/2006 | Jeong et al. | 455/550.1 |

FOREIGN PATENT DOCUMENTS

| | | | |
|---|---|---|---|
| KR | 1020020044729 A | | 6/2002 |
| KR | 10-2002-0046624 | * | 11/2002 |
| KR | 1020030028223 A | | 4/2003 |
| KR | 10-2005-0012067 | | 1/2005 |
| WO | WO 92/14344 A1 | | 8/1992 |
| WO | WO 2005/011314 A1 | * | 2/2005 |

OTHER PUBLICATIONS

Finlay, Understanding SDR Requirements, Jul. 2001, Wireless Systems Design, pp. 43-50.*
Symington et al., High Bandwidth Dynamically Reconfigurable Architectures Using Optical Interconnects, 1999, FPL '99, LNCS 1673, pp. 411-416.*
Office Action dated Oct. 20, 2009 in connection with Korean Patent Application No. 2007-2344.

* cited by examiner

*Primary Examiner* — Hoon J Chung

(57) ABSTRACT

A base station (BS) apparatus in a broadband wireless communication system is provided. The base station apparatus includes at least one function board for processing a baseband digital signal; at least one processor board for controlling the at least one function board; and at least one switch for routing a signal between the at least one function board and the at least one processor board.

20 Claims, 2 Drawing Sheets

BASE STATION APPARATUS BASED ON SWITCH FABRIC IN BROADBAND WIRELESS COMMUNICATION SYSTEM

CROSS-REFERENCE TO RELATED APPLICATION(S) AND CLAIM OF PRIORITY

This application claims priority under 35 U.S.C. §119(a) to an application filed in the Korean Intellectual Property Office on Jan. 9, 2007 and assigned Serial No. 2007-0002344, the disclosure of which is herein incorporated by reference.

TECHNICAL FIELD OF THE INVENTION

The present invention relates generally to a structure of a base station (BS) in a broadband wireless communication system, and in particular, to a BS apparatus with an easily extended structure in the broadband wireless communication system.

BACKGROUND OF THE INVENTION

In a broadband wireless communication system, a base station (BS) apparatus is a system component responsible for communications with a terminal through a radio channel and is a very central device in terms of the radio channel and the access management of the terminal in the wireless communication system.

The data rate required in fourth (4G) generation communication systems, which are the next-generation communication systems, will increasing from units of hundreds of Kbps to several Gbps. To respond to this, the base station is evolving into a structure capable of rapidly processing a number of digital data. In addition, chip sets including Field Programmable Gate Arrays (FPGAs), digital signal processors (DSPs), and high-speed processors, are advancing to process at the required digital data rates. However, since a single chip set is not able to satisfy the capacity required for new base stations, the structure of the base station is advancing to combine a plurality of chip sets.

FIG. 1 depicts a conventional base station (BS) structure in a broadband wireless communication system.

The base station of FIG. 1 can be divided largely into a digital processor and a radio frequency (RF) processor. The digital processor includes a backplane 110, a processor board 120, a channel card 130, and an intermediate frequency (IF) board 140. The RF processor includes a signal transceiver 150.

The backplane 110 provides signal paths among the components in the digital processor; that is, among the processor board 120, the channel card 130, and the IF board 140. The backplane 110 is of a fixed structure at the design phase of the base station. The structure of the backplane 110 limits the number of the processor boards 120, the channel cards 130, and the IF boards 140 connectable in the base station. That is, the backplane 110 determines the hardware structure of the base station.

The processor board 120 controls functions of the base station. For example, the processor board 120 processes interfacing with an external device and provides a digital signal fed from an upper layer to the channel card 130 to send the digital signal to a corresponding terminal.

The channel card 130 includes a processor 131, a DSP 133, and an FPGA 135. The channel card 130 performs encoding and decoding and modulating and demodulating; that is, functions as a modem. The processor 131 controls functions of the channel card 130. The DSP 133 and the FPGA 135 can be separate physical components but can be considered as the same functional component in the implementation. In some cases, the channel card 130 may include only one of the DSP 133 and the FPGA 135.

The IF board 140 converts the digital signal fed from the channel card 130 to an analog signal of the IF band and provides the analog signal to the signal transceiver 150, and converts an analog signal fed from the signal transceiver 150 to a digital signal and provides the digital signal to the channel card 130. The signal transceiver 150 converts and amplifies the signal fed from the IF board 140 to an RF signal and sends the RF signal over an antenna. The signal transceiver 150 amplifies and converts a signal received on the antenna to an IF signal and provides the IF signal to the IF board 140.

As mentioned above in FIG. 1, the digital processor of the base station is constituted on the board basis to execute the respective functions and the boards exchange the signals via the backplane. Herein, the backplane is formed as the fixed structure at the system design phase. Thus, to install more channel cards over the limited number to increase the processing capacity of the base station, it is necessary to design a new backplane. The channel card can be physically divided into the DSP, the FPGA, and the processor as shown in FIG. 1. When those chips are newly developed, it is required to re-configure the channel card. Besides, as the shape of the channel card changes, the interface also changes. In this situation, the alternation of the whole base station (BS) structure including the backplane may be inevitable. Namely, the conventional BS structure is vulnerable to the shape alternation caused by those reasons.

SUMMARY OF THE INVENTION

To address the above-discussed deficiencies of the prior art, it is a primary aspect of the present invention to substantially solve at least the above problems and/or disadvantages and to provide at least the advantages below. Accordingly, an aspect of the present invention is to provide a base station (BS) apparatus for facilitating the addition of channel cards to extend a capacity in a broadband wireless communication system.

Another aspect of the present invention is to provide a base station apparatus for facilitating the shape alternation in a broadband wireless communication system.

The above aspects are achieved by providing a base station apparatus in a broadband wireless communication system. The base station apparatus includes at least one function board for processing a baseband digital signal; at least one processor board for controlling the at least one function board; and at least one switch for routing a signal between the at least one function board and the at least one processor board.

Before undertaking the DETAILED DESCRIPTION OF THE INVENTION below, it may be advantageous to set forth definitions of certain words and phrases-used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 2:
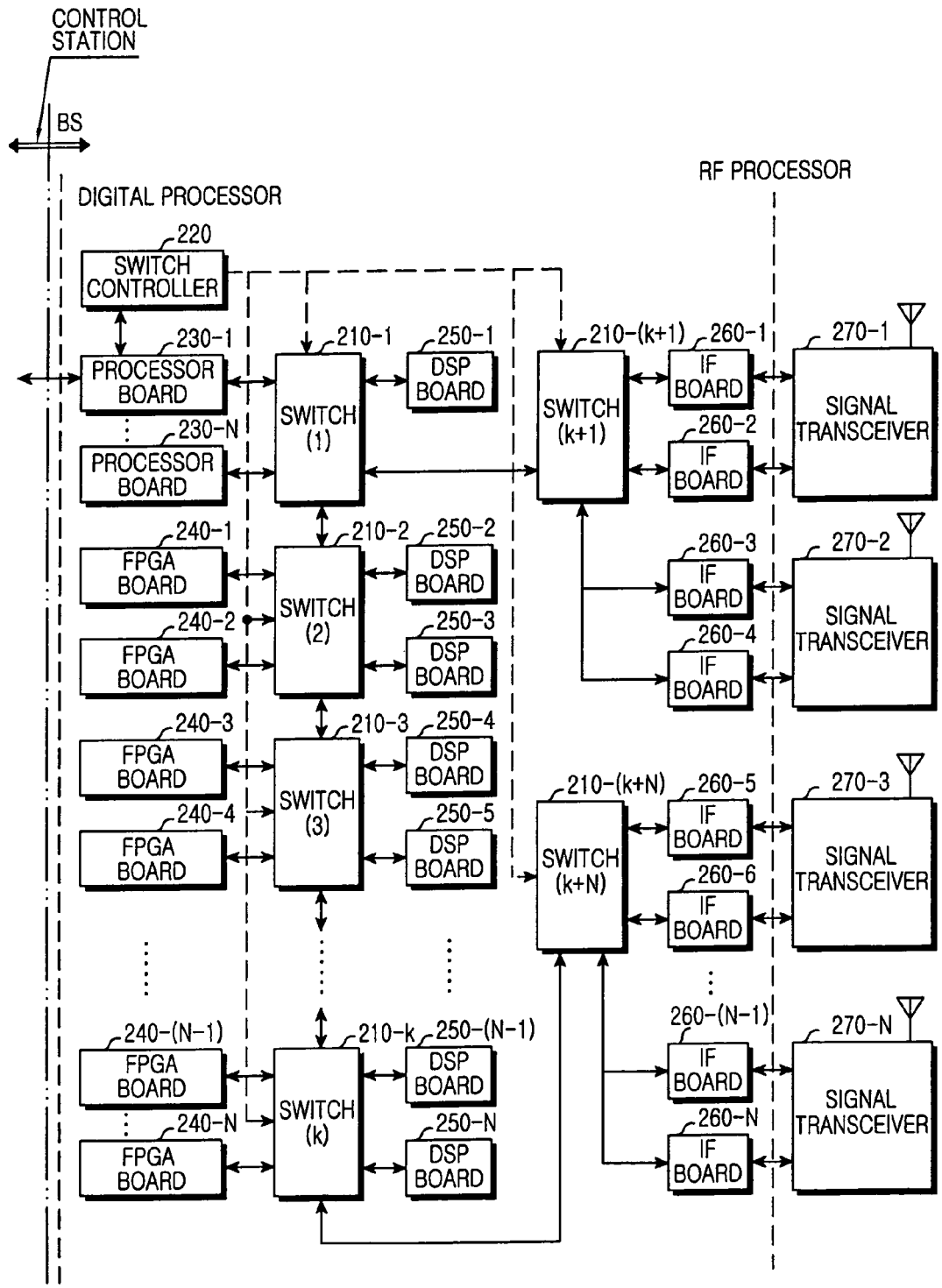
FIG. 2 depicts a BS structure in a broadband wireless communication system according to an embodiment of the present invention.

FIG. 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a base station (BS) structure for facilitating a capacity extension in a broadband wireless communication system.

FIG. 2 depicts a base station (BS) structure in a broadband wireless communication system according to an embodiment of the present invention.

The base station of FIG. 2 can be divided largely into a digital processor and a radio frequency (RF) processor. The digital processor includes switches 210-1 through 210-(k+N), a switch controller 220, processor boards 230-1 through 230-N, Field Programmable Gate Array (FPGA) boards 240-1 through 240-N, digital signal processor (DSP) boards 250-1 through 250-N, and intermediate frequency (IF) boards 260-1 through 260-N. The RF processor includes signal transceivers 270-1 through 270-N.

Figure 1:
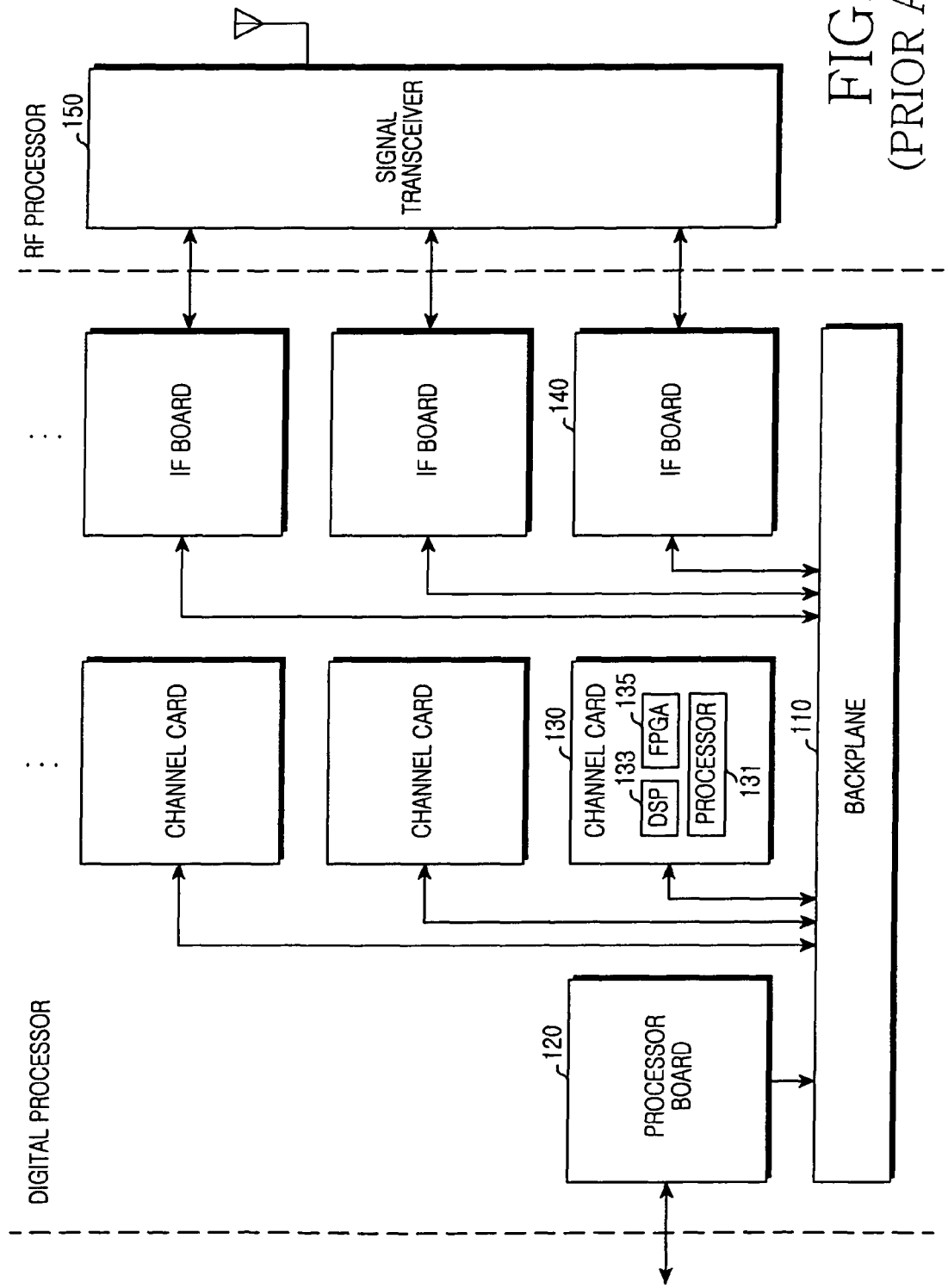
FIG. 1 depicts a conventional BS structure in a broadband wireless communication system.

The switches 210-1 through 210-(k+N) provide signal exchange paths among the function boards in the digital processor. For example, the switches 210-1 through 210-(k+N) can be constituted using a plurality of electrical switches or a plurality of optical switch fabrics. The switches 210-1 through 210-(k+N) can provide N×M or M×M ports and freely interconnect the function boards connected to the ports. Compared to the conventional apparatus of FIG. 1, the switches 210-1 through 210-(k+N) function as the backplane of FIG. 1. However, contrary to the fixed structure of the backplane 110, the switches 210-1 through 210-(k+N) can be extended according to a designer's intention by freely interconnecting the ports. With the extendable structure, the switches 210-1 through 210-(k+N) are not subject to the limitation on the number of the connectable function boards.

The switch controller 220 controls the routing of the ports of the switches 210-1 through 210-(k+N). More specifically, for the proper signal exchange among the function boards connected to N×M or M×M ports of the switches 210-1 through 210-(k+N), the switch controller 220 controls the routing between the ports of the switches 210-1 through 210-(k+N) of the base station.

The processor boards 230-1 through 230-N execute the functions of the base station. The processor boards 230-1 through 230-N execute the functions of the processor 131 of the channel card 130 of FIG. 1, as well as the interface processing function with the external device of the processor board 120. Since the channel cards are separated on the chip basis and constituted as the individual function boards in the base station of the present invention, the processor boards 230-1 through 230-N control modem functions of the FPGA boards 240-1 through 240-N and the DSP boards 250-1 through 250-N. In some cases, at least one of the processor boards 230-1 through 230-N control the routing of the ports of the switches 210-1 through 210-(k+N).

The FPGA boards 240-1 through 240-N and the DSP boards 250-1 through 250-N are the function boards including FPGA chips or DSP chips which carry out encoding and decoding and modulating and demodulating of information bit strings (i.e., modem functions). The FPGA boards 240-1 through 240-N and the DSP boards 250-1 through 250-N are classified based on whether the physical form of the embedded chip is the FPGA or the DSP. In the implementation, the FPGA boards 240-1 through 240-N and the DSP boards 250-1 through 250-N can be classified to the same board in terms of the function. Accordingly, the base station may include only one of the FPGA boards 240-1 through 240-N or the DSP boards 250-1 through 250-N.

The IF boards 260-1 through 260-N receive the digital signals from the FPGA boards 240-1 through 240-N or the DSP boards 250-1 through 250-N via the switches 210-1 through 210-(k+N), convert the digital signals to analog signals of the IF band, and output the analog signals to the signal transceivers 270-1 through 270-N. The IF boards 260-1 through 260-N convert analog signals fed from the signal transceivers 270-1 through 270-N to digital signals and provide the digital signals to the FPGA boards 240-1 through 240-N or the DSP boards 250-1 through 250-N.

The signal transceivers 270-1 through 270-N convert and amplify the signals fed from the IF boards 260-1 through 260-N to RF signals and transmit the RF signals over the antennas. The signal transceivers 270-1 through 270-N amplify and convert signals received on the antenna to IF signals and provide the IF signals to the IF boards 260-1 through 260-N.

When the switches 210-1 through 210-(k+N) are implemented using optical switch fabrics, every function board in the digital processor; that is, the processor boards 230-1 through 230-N, the FPGA boards 240-1 through 240-N, the DSP boards 250-1 through 250-N, and the IF boards 260-1 through 260-N include optical interface devices (not shown). Using the optical interface, the speed of the optical signals transmitted between the function boards can be 1.25 Gbps, 2.5 Gbps, and 10 Gbps. Also, using the optical interface, the optical signals can be transmitted and received by varying their wavelength on the board basis.

In FIG. 2, all of the processor boards 230-1 through 230-N are connected to the switch 210-1. For ease of explanation, the boards are arranged by discriminating or ordering them based on their type. In other words, the processor boards 230-1 through 230-N may be connected to any switch besides the switch 210-1 and the switch 210-1 has the same structure and function as the other switches.

As set forth above, by constituting the digital processor of the BS based on the extendable N×M or M×M switches in the broadband wireless communication system, function boards can be easily added to increase the capacity of the BS. When the switch is implemented using the optical switch, the design can be free from the channel capacity interference, Electro Magnetic Interference (EMI)/Electro Magnetic Compatibility (EMC), and the rapid signal transmission among the function board are feasible. Further, it is easy to increase the capacity and the RF antennas of the BS system to which Smart Antenna (SA) and Multiple Input Multiple Output (MIMO) techniques are applied. The present invention is applicable to next-generation wireless communication systems requiring the capacity over 1 Gbps and the MIMO antenna.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station apparatus in a broadband wireless communication system, the apparatus comprising:
    at least one function board configured to process a baseband digital signal;
    at least one processor board configured to control the at least one function board;
    at least one intermediate frequency (IF) board configured to receive digital signals from the at least one function board, convert the digital signals to analog signals, and transmit the analog signals to a signal transceiver; and
    at least one switch configured to perform a function of a backplane and provide at least one adjustable and extendable signal path among the at least one function board and the at least one processor board, the at least one switch further configured to selectively couple the at least one function board and the at least one IF board,
    wherein a number of ports to connect the at least one function board and the at least one processor board are increased by adding a new switch to the at least one switch.

2. The base station apparatus of claim 1, wherein the at least one function board comprises at least one of a digital signal processor (DSP) chip and a field programmable gate array (FPGA) chip.

3. The base station apparatus of claim 1, wherein the at least one switch comprises at least one electrical switch.

4. The base station apparatus of claim 1, wherein the at least one switch comprises an optical switch fabric.

5. The base station apparatus of claim 4, wherein the at least one processor board is connected to the at least one switch using an optical interface.

6. The base station apparatus of claim 4, wherein the at least one function board is connected to the at least one switch using an optical interface.

7. The base station apparatus of claim 1, further comprising:
    a controller configured to control the routing of the at least one switch.

8. The base station apparatus of claim 1, wherein the at least one processor board is further configured to control the routing of the at least one switch.

9. A wireless network comprising a plurality of base stations operable to communicate with mobile stations in a coverage area of the wireless network, wherein each of the base stations comprises:
    at least one function board configured to process a baseband digital signal;
    at least one processor board configured to control the at least one function board;
    at least one intermediate frequency (IF) board configured to receive digital signals from the at least one function board, convert the digital signals to analog signals, and transmit the analog signals to a signal transceiver; and
    at least one switch configured to perform a function of a backplane and provide at least one adjustable and extendable signal path among the at least one function board and the at least one processor board, the at least one switch further configured to selectively couple the at least one function board and the at least one IF board,
    wherein a number of ports to connect the at least one function board and the at least one processor board are increased by adding a new switch to the at least one switch.

10. The wireless network of claim 9, wherein the at least one function board comprises at least one of a digital signal processor chip and a field programmable gate array chip.

11. The wireless network of claim 9, wherein the at least one switch comprises at least one electrical switch.

12. The wireless network of claim 9, wherein the at least one switch comprises an optical switch fabric.

13. The wireless network of claim 12, wherein the at least one processor board is connected to the at least one switch using an optical interface.

14. The wireless network of claim 12, wherein the at least one function board is connected to the at least one switch using an optical interface.

15. The wireless network of claim 9, further comprising:
    a controller configured to control the routing of the at least one switch.

16. The wireless network of claim 9, wherein the at least one processor board is further configured to control the routing of the at least one switch.

17. A digital processor apparatus of a base station, the digital processor apparatus comprising:
    a plurality of function boards configured to process a baseband digital signal;
    a set of processor boards configured to control the plurality of function boards;
    a plurality of intermediate frequency (IF) boards configured to receive digital signals from the function boards, convert the digital signals to analog signals, and transmit the analog signals to one or more signal transceivers; and
    a set of switches configured to perform as a backplane of the digital processor apparatus and route signals among the plurality of function boards and between at least one of the set of processor boards and at least one of the plurality of function boards, the set of switches further configured to selectively couple the function boards and the IF boards.

18. The digital processor apparatus of claim 17, wherein the plurality of function boards comprises at least one of a plurality of digital signal processor (DSP) chips and a plurality of field programmable gate array (FPGA) chips.

19. The digital processor apparatus of claim 17, wherein the set of switches comprises at least one of a set of electrical switches and an optical switch fabric.

20. The digital processor apparatus of claim 17, further comprising:
    a switch controller configured to control the routing of the set of switches.

* * * * *